Sept. 6, 1932. H. W. STERTZBACH 1,875,770
MEANS FOR INTERLOCKING A JOURNAL BOX TO A SIDE FRAME
Filed May 2, 1930   3 Sheets-Sheet 3
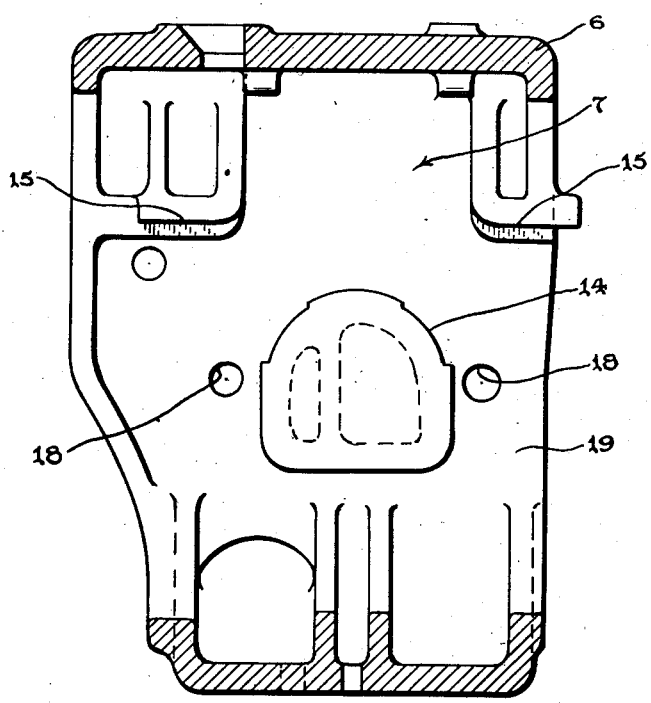
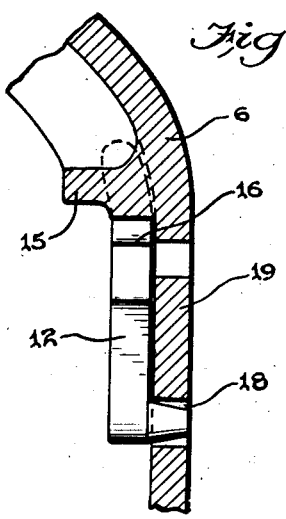

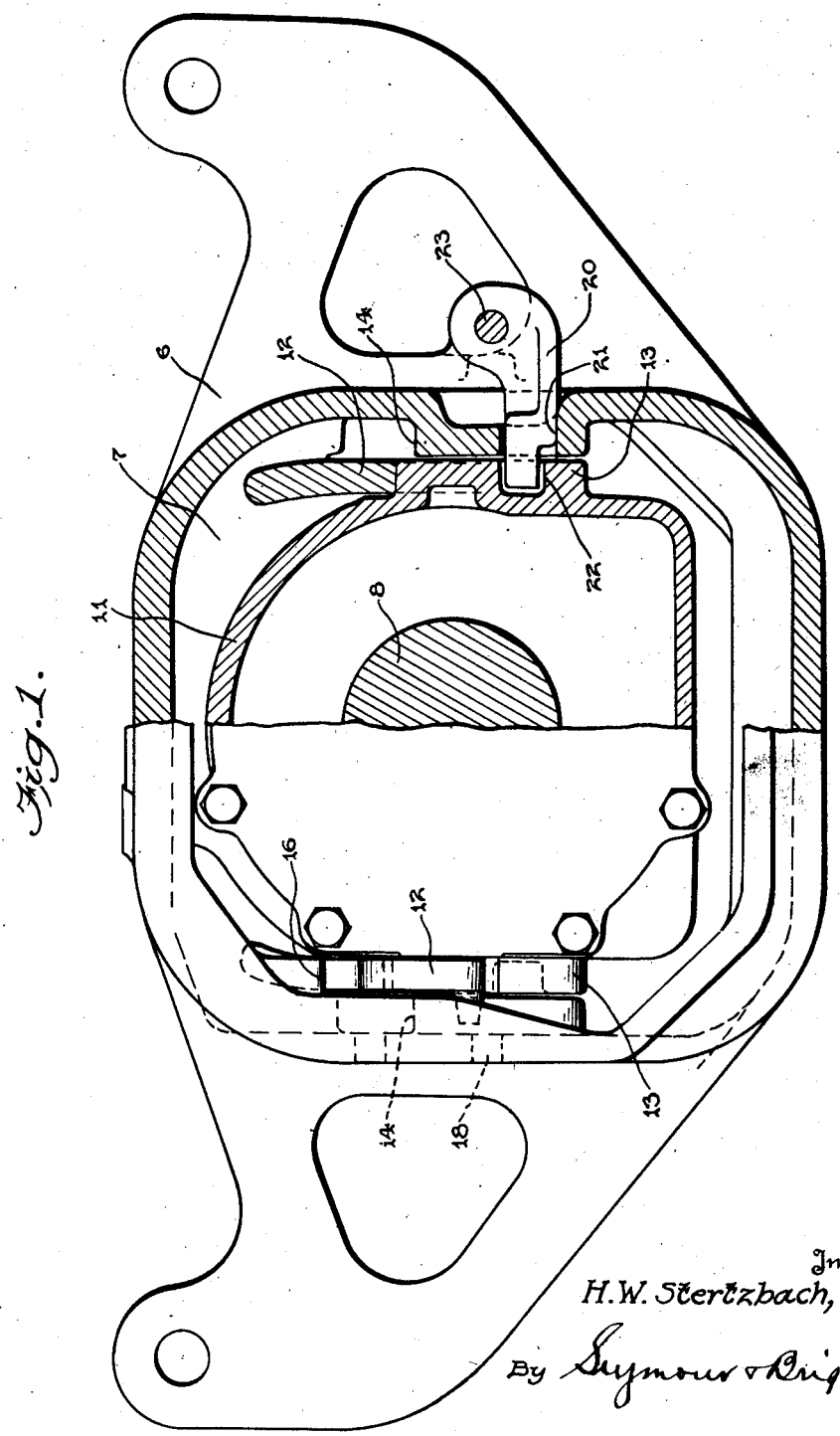

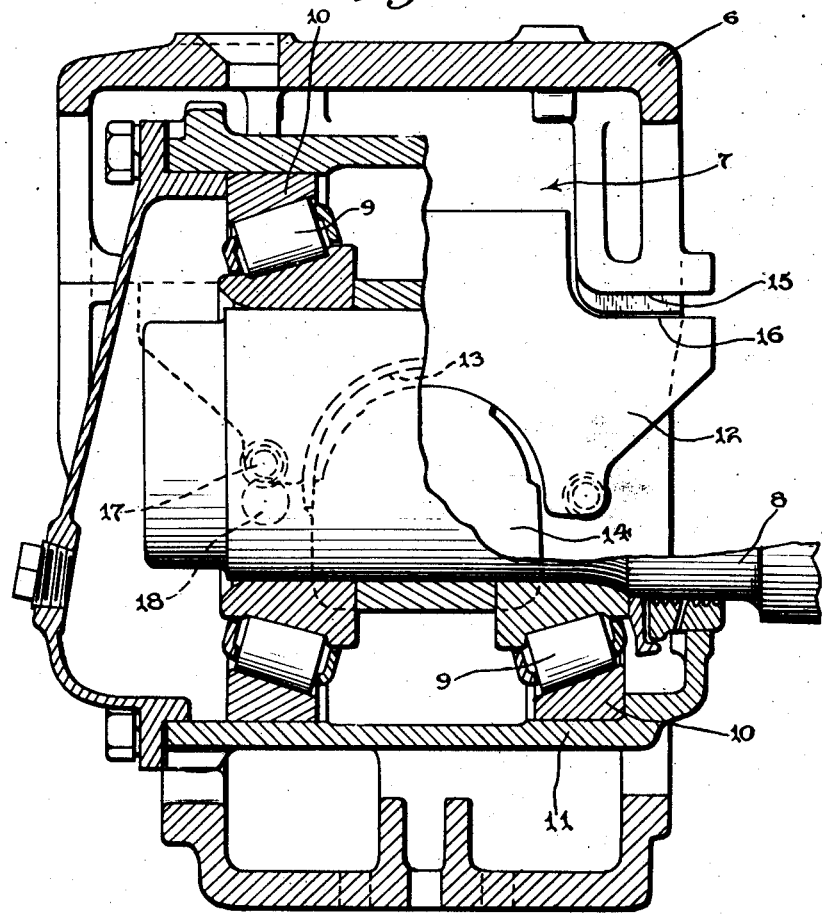
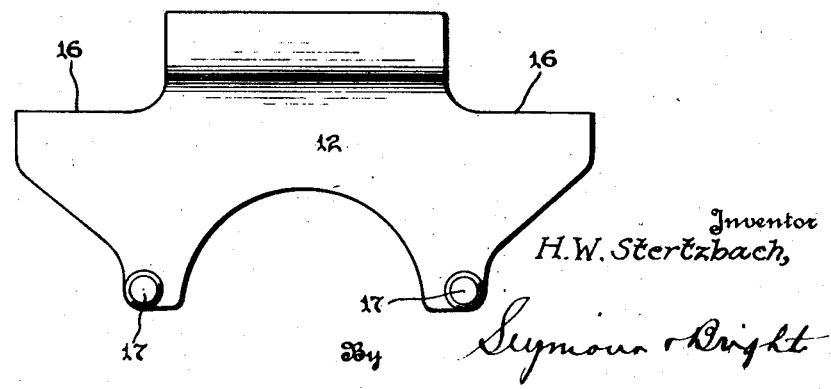

Patented Sept. 6, 1932

1,875,770

UNITED STATES PATENT OFFICE

HARRY W. STERTZBACH, OF COLUMBUS, OHIO, ASSIGNOR TO THE BUCKEYE STEEL CASTINGS COMPANY, OF COLUMBUS, OHIO

MEANS FOR INTERLOCKING A JOURNAL BOX TO A SIDE FRAME

Application filed May 2, 1930, Serial No. 449,259.

This invention relates to improvements in car trucks, and more especially to novel means for connecting a journal box to a side frame member.

In the Whitridge and Johnson Patent 1,079,199, dated Nov. 18, 1913, a six-wheel truck is shown, and each of the side frames of such a truck consists of two end members and a central equalizing member pivotally connected together. The present invention has been designed specifically for interlocking the central equalizing member to the journal box of the central axle, but of course, such improvements may be employed wherever it is desirable to connect a journal box to the side frame member.

When anti-friction bearings are used with such trucks, the journal box of such a bearing has been connected to the equalizing frame member by means of a pair of yokes, the equalizing member bearing on the yokes, and the yokes bearing on the journal box which houses the anti-friction bearings that are carried by the central axle. Such yokes, as heretofore constructed, can rock on the trunnions at opposite sides of the journal box, and this sometimes results in the yoke getting out of its vertical position. This condition is unsatisfactory, because of undue wear at line contact between the yoke and journal box trunnion, and the unstable condition of the assembly works in general as a disadvantage to the successful operation of the roller bearing means.

The main purpose of the present invention is to so improve such a construction that the yokes will be prevented from rocking after they have once been installed; while the journal box is free to rock relatively to the equalizer yoke, but in a plane transverse to the track or perpendicular to the vertical plane of the equalizer casting.

With this and other objects in view which will appear as the description proceeds, the invention consists in the novel features hereinafter described in detail in connection with the accompanying drawings, and more particularly pointed out in the appended claims.

Referring to the drawings,

Fig. 1 is a side elevation, partly in longitudinal vertical section, of a side frame equalizer member and an anti-friction bearing journal box, with my improvements applied thereto.

Fig. 2 is a transverse vertical sectional view partly in elevation of such an assembly; the sectional portion of this figure showing the parts in operative position and the elevation portion showing the parts as positioned during assembling.

Fig. 3 is a similar view on a reduced scale, of the side frame equalizer member.

Fig. 4 is a sectional view of a detail, and showing one of the yokes in the position which it occupies when straddling one of the false trunnions on the side frame member.

Fig. 5 is an elevation of the improved yoke.

In the drawings, 6 designates a side frame equalizer member having a central opening 7 into which the axle 8 projects. As shown in Fig. 2, anti-friction bearings 9 are mounted on the axle, and the outer rings 10 of such bearings engage the inner surface of the journal box 11 which also extends into the opening of the equalizing member.

When these parts are properly assembled, the equalizing member rests on a pair of yokes 12 which in turn are supported by trunnions 13 that project from opposite sides of the journal box. Of course, the box bears on the anti-friction bearings, and as these are mounted on the axle, and the axle is supported by the wheels, not shown, all of the elements will be properly supported.

In assembling a structure of this character, the yokes 12, (see Fig. 4), are placed on the false trunnions 14 of the equalizer member, and then such equalizer member is placed over the journal box 11, and then the yokes are shifted toward one another to transfer the yokes from the false trunnions 14 of the equalizer member, to the trunnions 13 of the journal box. Now, if the equalizer is lowered, shoulders 15, forming part of the same, will come to rest on the shoulders 16 of the yoke, as may be seen in Fig. 2.

Assuming a structure of this character, it will be noted that the yokes, when the parts are in assembled relation, as shown in Fig. 1, may cant or assume inclined positions on the trunnions 13, and this will result in the difficulties heretofore mentioned.

For the purpose of overcoming such disadvantage, I have provided each yoke with a pair of studs 17, which, when the yokes straddle the false trunnions 14, engage apertures 18 in the side walls 19 of the equalizer, as best shown in Figs. 3 and 4. These studs and apertures thus assist in initially connecting the yokes to the equalizer member, and after the journal box is inserted in the opening 7, and the tops of the trunnions 14 are brought to the same level as the tops of the trunnions 13, the yokes can be shifted toward one another, so as to disengage the studs 17 from the holes 18. Then, when the member 6 is dropped downwardly to bring the shoulders 15 to rest on the shoulders 16 of the yokes, the studs will be arranged above the apertures 18, and will be opposite solid portions of the vertical walls 19. Consequently, these studs will now cooperate with the walls 19, so as to prevent the yokes from rocking.

With the exception of the studs 17 on the equalizer yokes, and the engaging holes 18 in the equalizer casting, the assembly described was known prior to my invention, and was developed in order to provide alignment for the bearing in a plane perpendicular to the vertical plane of the equalizer. Without the studs of the yoke, it was found that the yoke could be "kicked out" of its vertical position, and would not go back of its own accord. As before stated, this condition is unsatisfactory for a number of reasons.

After the parts have been assembled in the manner described, a key 20 is inserted into apertures 21 and 22 respectively, in the equalizer member and the journal box, and then a bolt 23 is employed to lock the key in position, so as to retain all of the parts of the assembly in their respective positions.

From the foregoing it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. In combination, a side frame member having an opening therein, supporting elements on which the side frame member rests, a journal box carrying said supporting elements, and means for preventing the supporting elements from rocking out of their vertical plane, said means comprising side extensions to said supporting elements.

2. In a car truck, a side frame member having an opening therein, supporting yokes on which the side frame member rests, a journal box on which the yokes rest, and means for preventing the yokes from rocking on the journal box out of their vertical plane, said means comprising side extensions to said supporting elements.

3. In a structure of the character described, a side frame member provided with a false trunnion, a supporting yoke adapted to rest on said trunnion during assembly, and a pin and hole connection between the yoke and side frame member.

4. In a structure of the character described, a car truck side frame member having a false trunnion and an aperture, a supporting yoke adapted to rest on said trunnion during assembly, and a stud on the yoke extending into said aperture.

5. In a structure of the character described, a journal box provided with a trunnion, a supporting yoke resting on the trunnion, and means for preventing the yoke from rocking on the trunnion out of its vertical plane, said means comprising side extensions at said supporting elements.

6. In a car truck, a side frame member having an opening therein, a journal box arranged in the opening, yokes resting on the journal box and supporting said side frame member, and means for preventing the yokes from rocking on the journal box out of their vertical plane, said means comprising side extensions to said supporting elements.

7. In a car truck, a side frame member provided with a false trunnion, a journal box having a trunnion adapted to lie alongside the trunnion of the side frame member, a supporting yoke adapted to rest on either one of said trunnions, and means to prevent rocking of the yoke out of its vertical plane when it rests on the journal box trunnion, the yoke resting on the false trunnion during assembly of the parts.

8. A car truck comprising a side frame member having an inwardly extending false trunnion and apertures, a journal box provided with a trunnion arranged in close proximity to the trunnion of the side frame member, a supporting yoke adapted to rest on either one of said trunnions, and studs on the yoke designed to enter the apertures when the yoke occupies the false trunnion, and to prevent rocking of the yoke out of its vertical plane when the latter rests upon the trunnion of the journal box, the yoke resting on the false trunnion during assembly of the parts.

9. In a car truck, a side frame member having an opening therein, inwardly extending false trunnions on the side walls of the opening, each wall having a pair of apertures positioned at opposite sides of the false trunnion, a journal box extending into said opening and having trunnions extending toward the trunnions of the side frame member, supporting yokes adapted to rest on the trunnions of the side frame member or the trunnions of the journal box, and studs on the yokes to occupy the apertures when the yokes rest on the trunnions of the side frame member, and to prevent rocking of the yokes out of their vertical plane when the latter rest upon the trunnions of the journal box, the yokes resting on the false trunnions during assembly of the parts.

10. A car truck comprising a side frame member having opposite side walls partially defining an opening, a journal box in the opening having oppositely extending trunnions, yokes resting on said trunnions and supporting the side frame member, and projections on the yokes to prevent rocking of the yokes out of their vertical plane on said trunnions.

11. In a car truck, a central equalizer member having an opening therein, a journal box in the opening, supporting elements supporting the equalizer member and resting on the journal box, and projections on said supporting elements for preventing the same from rocking on the journal box out of its vertical plane.

12. In a car truck, a journal box provided with oppositely extending trunnions, supporting yokes resting on said trunnions, a car truck side frame having shoulders resting on said yokes, and projections on the yokes cooperating with the side frame member for preventing the yokes from rocking on the journal box out of their vertical plane.

13. In a car truck, a journal box provided with oppositely extending trunnions, supporting yokes resting on said trunnions, a car truck side frame having shoulders resting on said yokes, projections on the yokes cooperating with the side frame member for preventing the yokes from rocking on the journal box out of their vertical plane, and a key detachably connecting the journal box to the side frame member.

14. In a car truck, a journal box provided with oppositely extending trunnions, supporting yokes resting on said trunnions, a car truck side frame having shoulders resting on said yokes, projections on the yokes cooperating with the side frame member for preventing the yokes from rocking on the journal box out of their vertical plane, said journal box and the side frame member having aligned apertures, and a key secured to the side frame member and extending into said apertures for interlocking the side frame member to the journal box.

15. In combination, a side frame member having an opening therein, supporting elements on which the side frame member rests, a journal box carrying said supporting elements, and means for preventing the supporting elements from rocking out of their vertical plane, said means including projections arranged between said elements and the side frame.

In testimony whereof, I have signed this specification.

HARRY W. STERTZBACH.